Nov. 6, 1956     E. T. BODARD     2,769,413
CORD INSERTION APPARATUS Filed May 4, 1953                                   9 Sheets—Sheet 1

INVENTOR
EUGENE THOMAS BODARD
BY
Fetherstonhaugh & Co.
ATTORNEYS

Nov. 6, 1956  E. T. BODARD  2,769,413
CORD INSERTION APPARATUS
Filed May 4, 1953  9 Sheets-Sheet 2

Fig.4.

INVENTOR
EUGENE THOMAS BODARD
BY
Fetherstonhaugh & Co.
ATTORNEYS

Nov. 6, 1956

E. T. BODARD 2,769,413

CORD INSERTION APPARATUS

Filed May 4, 1953

INVENTOR
EUGENE THOMAS BODARD
BY
Fetherstonhaugh & Co.
ATTORNEYS

Nov. 6, 1956     E. T. BODARD     2,769,413
CORD INSERTION APPARATUS

Filed May 4, 1953                                 9 Sheets—Sheet 7

INVENTOR
EUGENE THOMAS BODARD
BY
Fetherstonhaugh & Co.
ATTORNEYS Nov. 6, 1956  E. T. BODARD  2,769,413
CORD INSERTION APPARATUS
Filed May 4, 1953  9 Sheets-Sheet 8

INVENTOR
EUGENE THOMAS BODARD
BY
Fetherstonhaugh & Co.
ATTORNEYS

Nov. 6, 1956 E. T. BODARD 2,769,413
CORD INSERTION APPARATUS
Filed May 4, 1953 9 Sheets-Sheet 9

INVENTOR
EUGENE THOMAS BODARD
BY
Fetherstonhaugh Co.
ATTORNEYS

United States Patent Office 2,769,413
Patented Nov. 6, 1956

2,769,413

CORD INSERTION APPARATUS

Eugene Thomas Bodard, Nelson, British Columbia, Canada

Application May 4, 1953, Serial No. 352,936

19 Claims. (Cl. 112—2)

This invention relates to apparatus for inserting cords in carton blanks and the like made up of two or more thicknesses of material.

Although this apparatus may be used for various purposes, it is particularly designed to insert one or more cords in carton blanks, said cords acting as handles when the blanks are formed into cartons. The apparatus is described herein in connection with a carton blank comprising two layers of cardboard with an intermediate layer of corrugated cardboard therebetween.

The carton blank is held in position in any desired manner, and the apparatus includes one or more needles slidably supported in line with an edge of the blank in the same plane as the latter, each needle being long enough to extend through the blank and having gripping means at the end thereof which is moved through the blank. Suitable means is provided for moving each needle through the blank, after which a cord is grasped by each gripping means and drawn back through the blank as its needle is withdrawn therefrom. The cord is released by the gripping means when the needle or needles clear the blank.

One way of providing cord-gripping means is to extend each needle through a tube and to have a hook on one end of the needle. The tube and needle are moved through the blank together and the hook is moved away from the adjacent tube end after this has been done. A cord is so placed that when the hook is drawn towards the tube end, it is drawn against the latter and firmly held. After the tube and needle have been withdrawn from the blank, the needle hook is moved away from the tube end to release the cord.

Cord for the carton blanks may be fed by hand, but it is preferable to provide automatic means for supplying cord to the apparatus and for positioning the cord therein so that it is ready to be grasped by the gripping means and drawn through the blank. In the illustrated form of the invention, the opposite ends of two cords are drawn through each blank at the same time. Each cord forms a U in the blank, and it is desirable to provide means for tucking the bottom of each U into the edge of the blank.

An example of this invention is illustrated in the accompanying drawings, in which.

Figure 1:
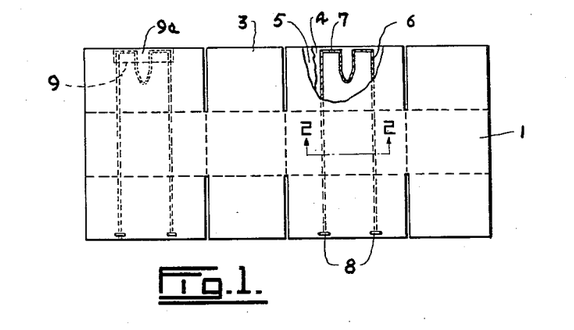
Figure 1 is a reduced flat lay-out of a carton blank.
Figures 2, 3:
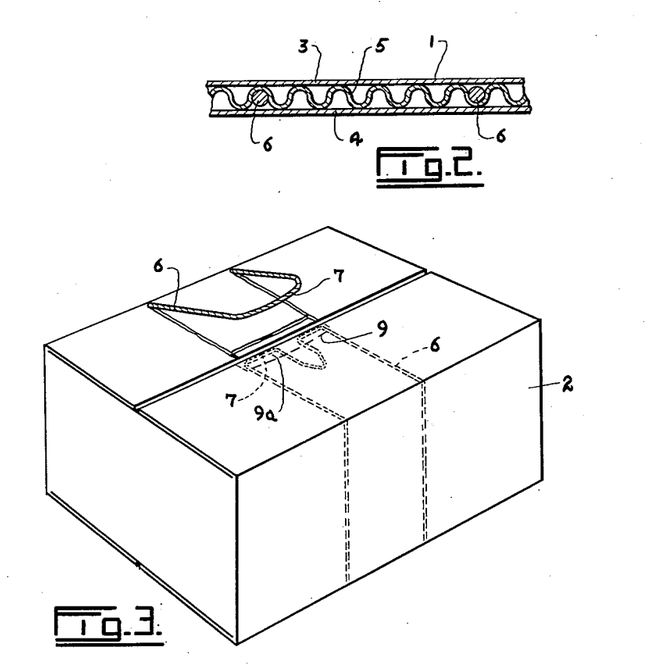
Figure 2 is an enlarged section taken on the line 2—2 of Figure 1.
Figure 3 is a perspective view of a carton having two cords therein, one of which has been partially drawn through the material of the carton so that it is ready to be used as a handle.

Referring to Figures 1 to 3 of the drawings, 1 is a blank which is cut and creased so that it may be folded into a carton 2, shown in Figure 3. This blank may be formed in any desired manner, and the one illustrated herein comprises spaced outer layers 3 and 4 formed of cardboard or the like with an intermediate corrugated layer 5 of similar material therebetween. This blank has two cords 6 therein, each cord being substantially in the form of a U, the bottom 7 of which is located adjacent one edge of the blank and the free ends of which are located adjacent the opposite edge thereof and are secured in position by staples 8. A portion of the U bottom 7 of the cord is tucked into the blank, as clearly illustrated in Figure 1. Perforations 9 may be formed in the layer 3 at the U end of each cord in order to form a flap 9a which may be easily removed in order to expose said cord end.

Figure 3 shows one cord 6 in dotted lines in its normal position in a folded carton. When it is desired to carry the carton, the flaps 9a are torn away along the perforations 9 to expose the ends 7 of each cord. These ends which are actually in the form of loops may now be pulled outwardly from the carton material to act as handles. One end has been pulled out in this manner in Figure 3.

Figure 4:
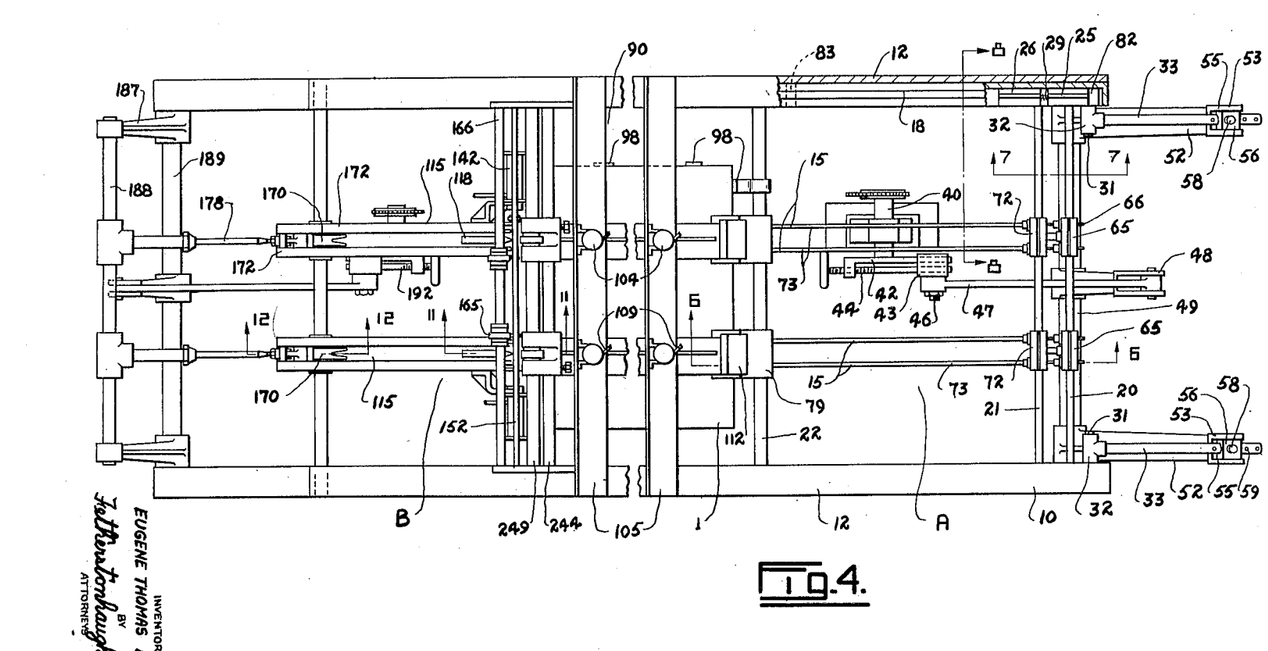
Figure 4 is a plan view of the cord insertion apparatus.
Figure 5:
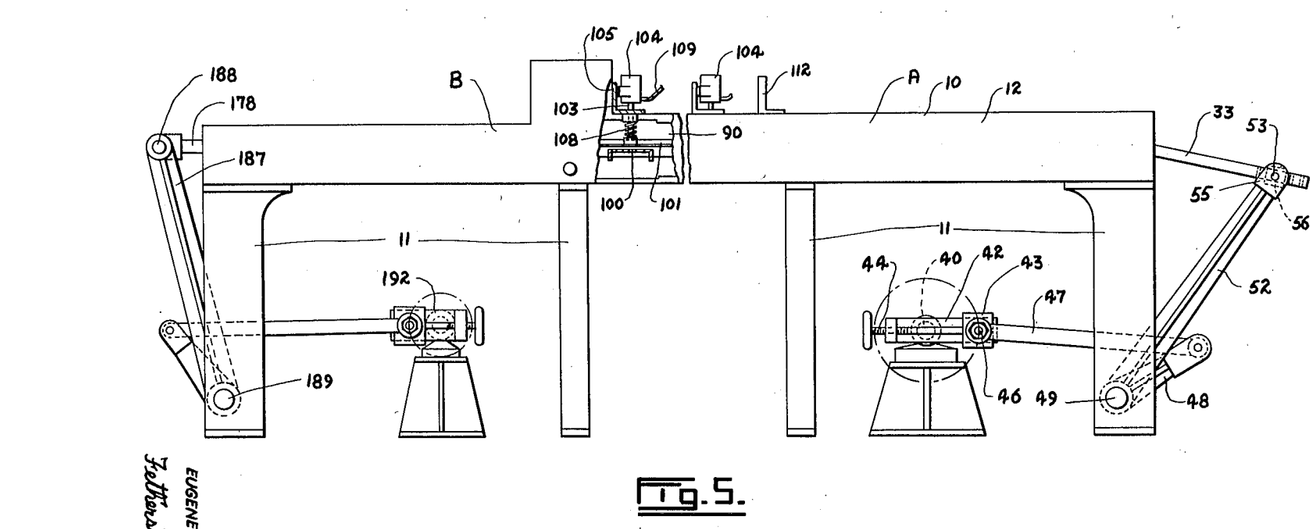
Figure 5 is a side elevation of the apparatus.

Referring to Figures 4 and 5, the cord insertion apparatus comprises a cord inserting mechanism A at one end and cord feeding and positioning mechanism B at the opposite end. The apparatus includes a main frame 10 with suitable supports or legs 11, said frame having two spaced side supporting members 12 extending longitudinally of the machine. Each of these side members is U-shaped in cross section and opens inwardly of the machine to act as a supporting track.

*Cord inserting mechanism A*

The illustrated form of the cord inserting mechanism includes two sets 15 of tubes and needles, but it is to be understood that one or any desired number of these sets may be employed. As the two sets 15 are identical, only one will be described herein in detail.

Figure 7:
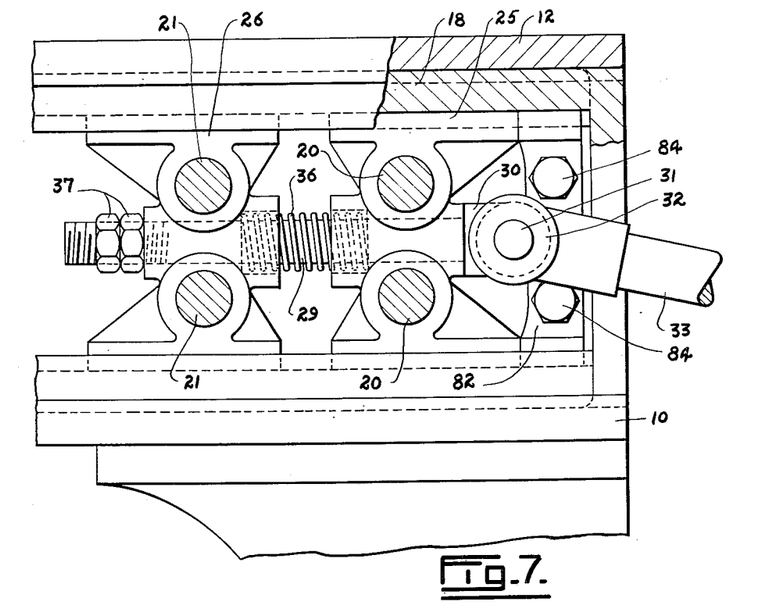
Figure 7 is an enlarged sectional detail taken on the line 7—7 of Figure 4.
Figure 8:
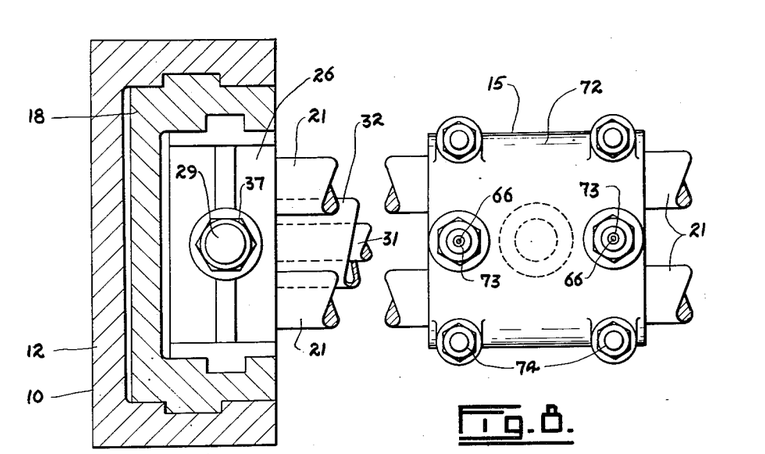
Figure 8 is an enlarged sectional detail taken on the line 8—8 of Figure 4.

The cord inserting mechanism A includes a pair of channel-shaped side members 18 slidably mounted within the frame members 12, there being one side member in each frame member. Suitable transverse supporting means are provided for the tube and needle sets 15. These may consist of single shafts extending between the side members 18 with suitable means for preventing rotation of the elements thereon around said shafts. However, it has been found advantageous to provide pairs of shafts for this purpose. In this example, three pairs of shafts 20, 21 and 22 are provided, see Figures 1, 6, 7 and 8. The shafts 20 are mounted at their opposite ends in crossheads 25 slidably mounted in the side members 18. Similarly, the shafts 21 are mounted at their opposite ends in crossheads 26 slidably mounted in the side members 18 adjacent the crossheads 25, see particularly Figures 7 and 8. The shafts 22 are fixably mounted at their opposite ends in the side members 18 in any desired manner spaced from the normal at-rest position of the crossheads just referred to.

The crossheads 25 and 26 are designed to move together most of the time, but at each end of their stroke, one moves a short distance relative to the other. Each pair of crossheads 25 and 26, there being one pair at each side of the machine, has a bolt 29 freely extending therethrough longitudinally of the machine. A head 30 is connected to one end of the bolt and a stub shaft 31 extends from this head inwardly of the machine. A bearing sleeve 32 is rotatably mounted on the stub shaft and has a rod 33 extending outwardly therefrom away from the centre of the machine, see Figures 4, 5 and 7. The crossheads are kept apart on the bolt 29 by a spring 36 extending therebetween, and one or two lock nuts 37 are threaded on the inner end of the shaft to keep the assembly together. The position of the crossheads relative to each other may be adjusted by tightening and loosening the nuts on the shaft.

Suitable means is provided for reciprocating the crosshead assemblies back and forth in the side members 18. One way of doing this is illustrated in Figures 4 and 5. A drive shaft 40 is mounted beneath the main frame 10 and is adapted to be connected to a suitable source of power, not shown, in any desired manner. A bar 42 extends across and is connected to one end of the shaft, and has a head 43 slidably mounted thereon. This head may be adjusted longitudinally of the bar by means of an adjusting screw 44. A pin 46 projects outwardly from this head and is connected by a link 47 to the bifurcated outer end of a lever 48, the inner end of which is fixably connected to a shaft 49 extending transversely of the mechanism and supported by a pair of legs 11 thereof. A relatively long arm 52 is connected to each end of the shaft 49, each of these arms extending upwardly and being adjustably connected to one of the rods 33 at 53 in any convenient manner. In this example, each arm 52 has a bifurcated upper end 55 in which a block 56 is swingably mounted. The rod 33 slidably extends through this block, and a pin 58 removably extends through the block and into one of a plurality of holes 59 in the rod.

When the bar 42 is rotated by the drive shaft 40, the link 47 reciprocates the lever 48 which, in turn, rocks the shaft 49. This movement of the shaft reciprocates the outer ends of the arms 52 to move the rods 33 back and forth. These rods move the crosshead assemblies with the rods 20 and 21 back and forth in the side members 18. As the arms 52 are relatively long, the stroke of the crosshead assemblies and their rods is comparatively great. The length of the stroke of these elements may be adjusted by turning the adjusting screw 44 to move the head 43 on the bar 42. The position of the strokes in the machine may be adjusted by shifting the upper ends of the arms 52 along the rods 33.

Figures 6, 9, 10:
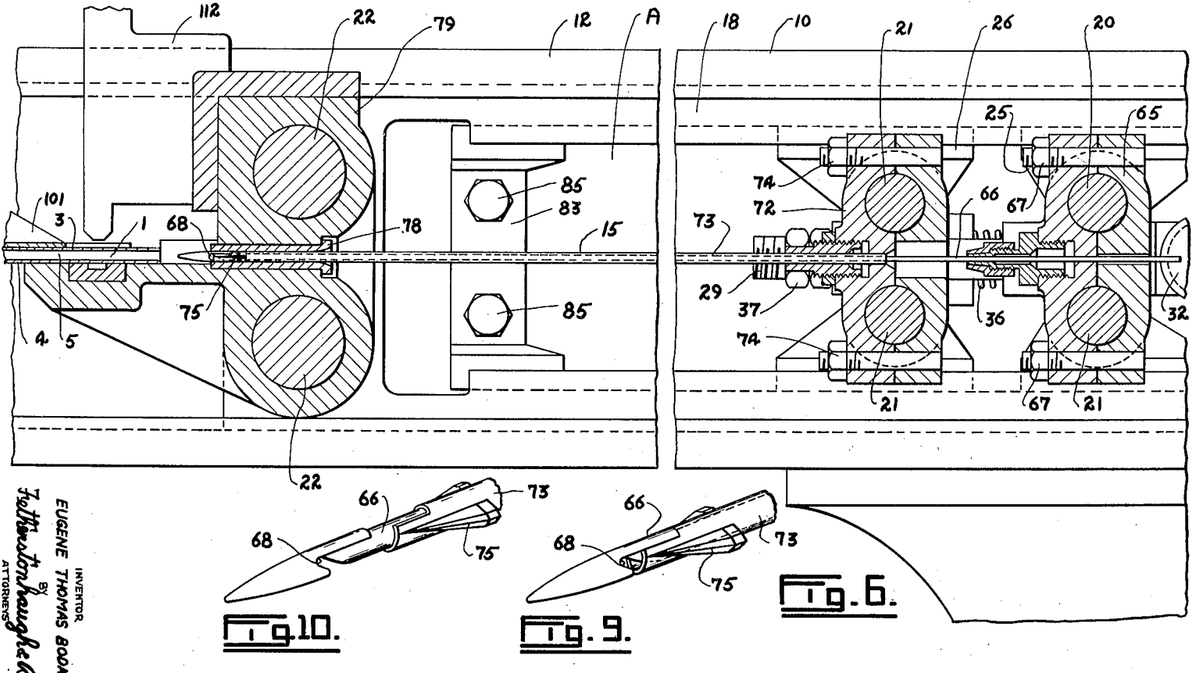
Figure 6 is an enlarged section taken on the line 6—6 of Figure 4.
Figure 9 is an enlarged perspective view of the end of a tube and needle arrangement in the cord-gripping position.
Figure 10 is a view similar to Figure 9 with the needle in the cord-released position.

Each set of tubes and needles 15 includes a carrier 65 slidably mounted on the shafts 20. This carrier supports one or more needles 66, there being two such needles illustrated in this example. Each needle is adjustably supported by its carrier and extends inwardly of the machine. The carrier is adjustably secured to the shafts by suitable locking means, such as nuts and bolts 67. Each needle has a hook 68 on its inner end. A carrier 72 is slidably mounted on the shafts 21 and has one or more tubes 73 extending inwardly of the machine therefrom, there being one tube for each needle 66 through which the latter extends. This carrier is secured on its shafts by clamping nuts and bolts 74. These tubes are of such length that when the carriers 65 and 72 are in their normal positions relative to each other, the hooks 68 of the needles are positioned right at the free ends of the tubes, as clearly shown in Figure 9. When one carrier is moved towards the other, the free ends of the tubes and the hooks separate, as shown in Figure 10. If desired, each tube may be provided with lateral cutters 75 at its free end.

The tubes 73 slidably extend through guides 78 carried by a block 79 which is slidably mounted on the shafts 22, said block being adjustably clamped on the shafts in any desired manner. When the crossheads 25 and 26 are in their outermost positions, the free ends of the tubes are positioned at the ends of the guides 78 so that the hooks 68 of the needles project beyond the ends of said guides, see Figure 6.

When the machine is in operation, the crossheads 25 and 26 are reciprocated longitudinally thereof so that the tubes 73 and their needles 66 move back and forth through the guides 78. As it is desirable to move the crossheads relative to each other at each end of their strokes, stops 82 and 83 are provided adjacent opposite ends of the side members 18 in line with the crossheads. These stops are adjustably held in position in any convenient manner, such as by means of bolts 84 and 85, see Figures 6 and 7. As the crosshead assemblies approach the inner end of each stroke, crossheads 26 engage the stops 83, stopping these crossheads while the others are still in motion. This moves the needle hooks 68 outwardly from the ends of their respective tubes. During the first part of the outward stroke, crosshead 25 moves away from crosshead 26 until the inner nut 37 engages the end of the latter. As the assemblies approach the outer end of the stroke, the crossheads 25 engage the stops 82 while crossheads 26 are still moving. This moves the free ends of the tubes 73 away from the needle hooks.

As previously stated, this machine draws a plurality of cords through a cardboard blank 1 which is to be formed into a carton 2. A section 90 is provided in the cord inserting mechanism A for receiving a blank 1. The blank may be fed into the section 90 by hand or automatically in any desired manner. Suitable stops 98 are provided for positioning each blank properly in the section. Furthermore, the blank may be clamped in its proper position by any suitable mechanism. In this example, the blank lays on a plurality of spaced transverse supports 100, and is held in position by spring-loaded pressure bars 101, there being one of these bars in line with each set 15 of tubes and needles. Each of these bars has a plurality of rods 103 extending upwardly therefrom into pneumatic or hydraulic cylinders 104 carried by brackets 105 which are supported by the side frame members 12. These rods are connected to pistons, not shown, within the cylinders, and springs 108 lying between the bars and the brackets 105 normally press the former downwardly to clamp the blank 1 in position. When it is desired to release the blank, fluid is directed to the cylinders 104 through pipes 109 from a suitable source, not shown, to raise the pistons in the cylinders, thereby raising the pressure bars 101.

The supports 100 carry the blank in the same plane as the tube and needle assemblies 15. These assemblies are in their retracted or outermost positions when a blank is placed in the section 90. After the blank is clamped in position, the needles and tubes are moved inwardly of the machine so that they pass through the blank between the cardboard layers 3 and 4. The needles and tubes may break through portions of the corrugated layer 5. If the side cutters 75 are employed on the tubes 73, they cut through this corrugated layer and reduce the possibility of it being dragged out of shape.

After the needles have drawn cords through the blank, the ends of the latter are stapled and/or glued in position. For this purpose, staplers 112 may be mounted on top of the blocks 79. Any desired type of stapler may be used for this purpose.

*Cord feeding and positioning mechanism B*

This mechanism is illustrated in Figures 4 and 11 to 20. There is a cord feeding and positioning mechanism for and in line with each set of tubes and needles 15, and each mechanism is adjustable laterally of the machine. In the illustrated example, there are two such mechanisms 115, and as they are identical, only one will be described in detail.

As previously stated, a blank 1 is clamped in the section 90 of the cord inserting mechanism. As each piece of cord inserted in the blank is in the form of a U, there usually is an excess of cord at the bottom of the U which has to be tucked into the blank between the layers 3 and 4. For this purpose, it is desirable to slit a portion of the intermediate layer 5 in order to receive this excess cord.

Figures 11, 20, 21:
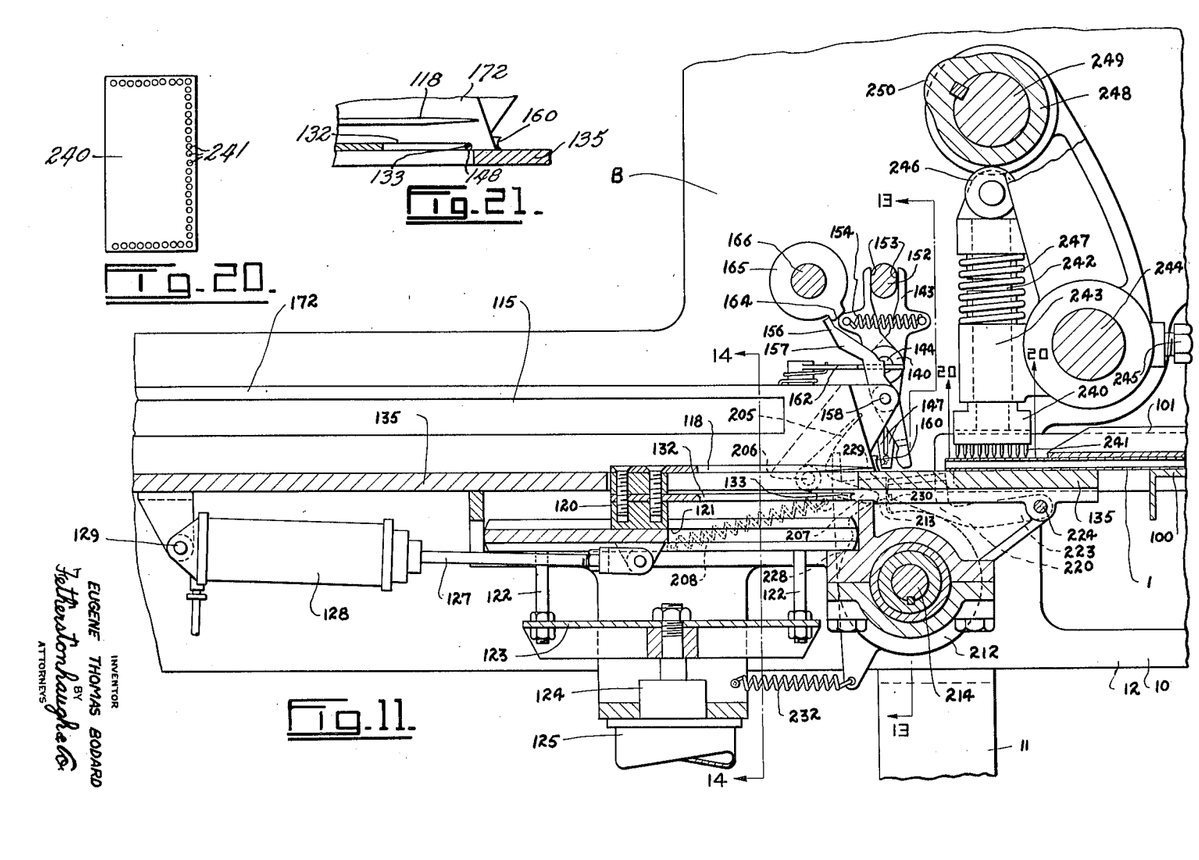
Figure 11 is an enlarged longitudinal section taken on the line 11—11 of Figure 4.
Figure 20 is a section taken on the line 20—20 of Figure 11 looking up at the lower surface of a perforating head.
Figure 21 is a fragmentary vertical section taken substantially on the line 21—21 of Figure 19.

A slitter blade 118 is provided, said blade extending longitudinally of the machine within the mechanism 115, see Figures 1 and 11. This blade is mounted on the upper end of a post 120 slidably mounted in tracks 121 which is supported by bolts 122 projecting upwardly from a plate 123. This plate is supported by the upper end of a piston rod 124 of a pneumatic or hydraulic cylinder 125 controlled in any desired manner. The lower end of the post 120 is pivotally connected to a piston rod 127 projecting from a pneumatic or hydraulic cylinder 128 pivotally mounted at 129 at one end thereof. This cylinder is also controlled in any desired manner.

An elongated tucker 132 spaced beneath the blade 118 projects in the same direction as the latter from the post 120. This tucker has a groove 133 formed in the outer or free end and sides thereof.

Referring to Figure 11, it will be seen that the slitter blade 118 is mounted to slide over a table 135 upon which a portion of the blank 1 rests. When the elements are in the position shown in this figure, the cylinder 128 may be operated to move the blade over the table and into the edge of the carton blank 1 which is clamped in position as previously described. This slits the intermediate layer 5 so that it is ready to receive the excess cord. After this is done, the slitting blade is retracted in order to enable a cord to be positioned in the machine.

Some time after the slitting operation, the cylinder 125 is operated to raise the plate 123 and tracks 121 a short distance. This raises the tucker 132 into a position so that it may be moved over the surface of the table 135 by the cylinder 128. The purpose of this will be hereinafter described.

Figures 16, 17:
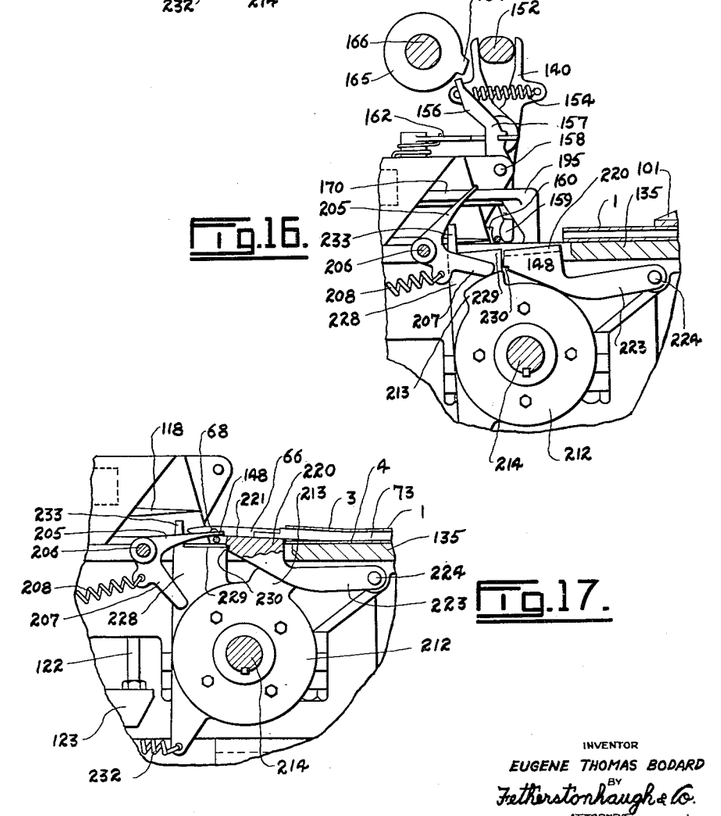
Figure 16 is a view similar to Figure 15 with a cord in the machine.
Figure 17 is a view similar to Figures 15 and 16 at a later stage in the operation of the apparatus.

The next operation of the mechanism 115 is to draw a cord across the machine. For this purpose, a gripper 140 is mounted on the end of a piston rod 141 projecting from a hydraulic or pneumatic cylinder 142 which is controlled in any convenient manner, see Figures 11 and 13. The gripper comprises a pair of crossed arms 143 which are pivotally mounted substantially midway between their opposite ends on a small shaft 144 projecting from the piston rod 141, as indicated at 146. The lower ends of these arms form gripping fingers 147 between which a cord 148 may be gripped, said cord passing from a suitable source of supply, not shown, through a feeding fer- rule 149. The upper ends of the arms 143 lap a transverse shaft 152 having flat sides 153. A spring 154, see Figure 11, draws the upper ends of these arms against the shaft. When these ends bear against the flat sides of the shaft, the gripping fingers 147 are closed, and when the shaft is rotated, it spreads the arm ends apart to open the fingers, as shown in Figure 16.

Figure 15:
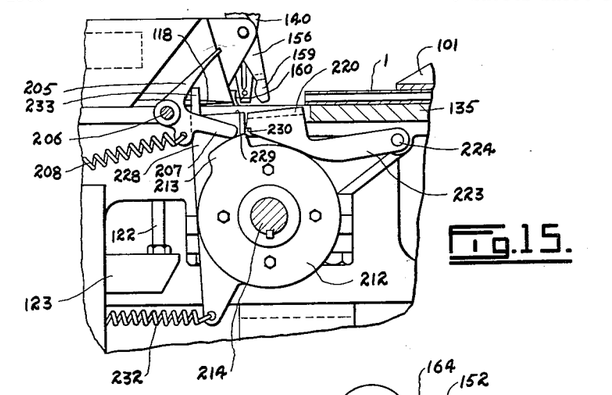
Figure 15 is a vertical section taken on the line 15—15 of Figure 13 with parts of the machine in position for receiving a cord.

At the proper time, the cylinder 142 is operated to move the piston rod 141 outwardly, moving the gripper 140 transversely of the machine. This draws the cord 148 across the mechanism 115 to a stationary gripper 156 which consists of an arm 157 pivotally mounted at 158 substantially midway between its ends, and having a finger 159 at its lower end which normally bears against a stationary gripping block 160 in line therewith, see Figure 16. This gripping finger is retained in its position by a spring arrangement 162. The upper end of the arm 157 is in line with a lug 164 projecting from a cam 165 mounted on a transverse shaft 166. At the appropriate time, this shaft rotates to press the lug 164 against the upper end of the gripper arm to move the finger 159 away from the block 160, as shown in Figures 11 and 15. At this time, the gripper 140 moves to insert the end of the cord 148 between the finger and block. As soon as this is done, the cam lug clears the upper end of arm 157 so that the finger presses the cord against the block 160 firmly to hold the end of the cord in position. The shaft 152 now rotates to separate the fingers 147 of the gripper 140 so that the latter is free of the cord while it is returning to its normal at-rest position. The fingers remain open until it is time to draw another piece of cord across the machine.

It is now necessary to draw the required amount of cord into the machine. For this purpose, the cylinder 125 is operated to raise the tucker 132 into line with a surface of table 135, see Figure 21. At this time, the free end of the tucker is positioned near the portion of the cord 148 extending across the mechanism 115. For this purpose, a drawback bar 170 is provided. This bar normally rests at a position spaced from the cord feed mechanism, as clearly shown in Figure 4. The bar is reciprocated by suitable mechanism between guides 172 which extend longitudinally of the machine and are adjustable laterally in any convenient manner. The drawback bar is pivotally mounted at 174 adjacent its outer end 175 in a carriage 176 slidably mounted in the guides 172, see Figure 12. The end 175 of the bar extends downwardly and outwardly and is pivotally connected at 177 to an extensible link 178 which, in turn, is connected to the upper end of a reciprocating arm 187 by a shaft 188, the lower end of said arm being fixedly secured to a shaft 189 extending transversely of the machine and supported by legs 11 thereof. This arm is reciprocated in any convenient manner, and an adjustable mechanism 192 is illustrated for this purpose, this mechanism being the same as the mechanism employed for reciprocating the crosshead assemblies of the cord inserting mechanism A.

Figure 12:
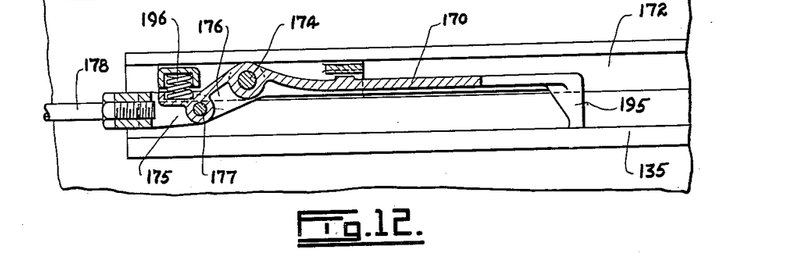
Figure 12 is an enlarged longitudinal section taken on the line 12—12 of Figure 4.
Figure 13:
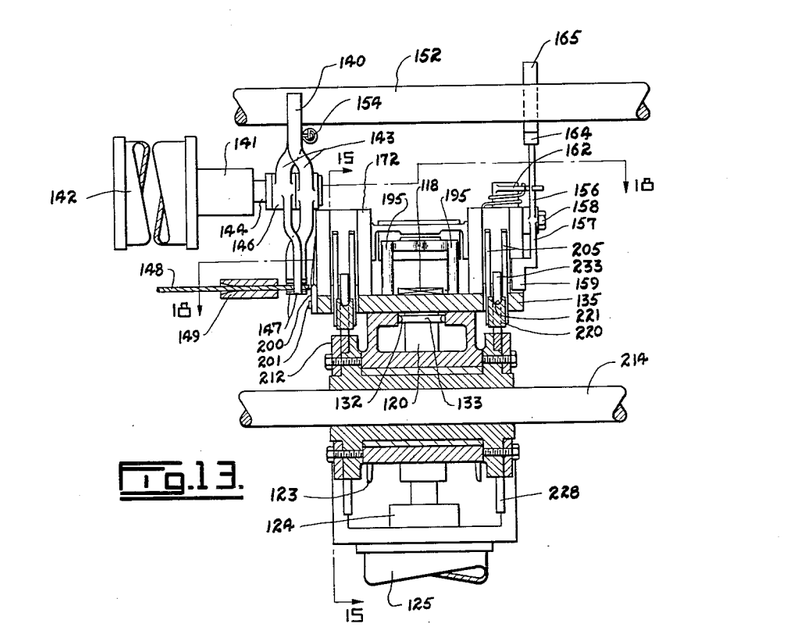
Figure 13 is a cross section taken on the line 13—13 of Figure 11.
Figure 14:
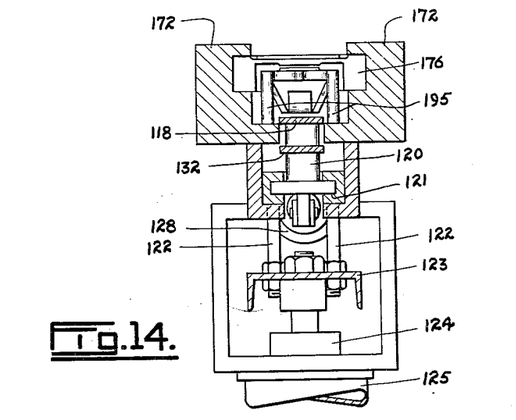
Figure 14 is another cross section taken on the line 14—14 of Figure 11.
Figure 18:
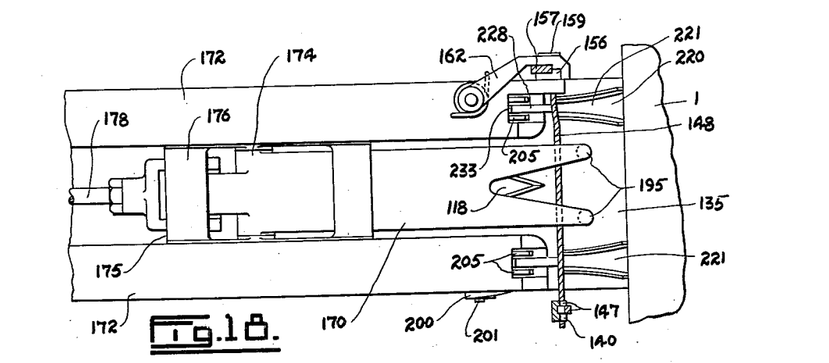
Figure 18 is a horizontal section taken substantially on the line 18—18 of Figure 13 with a cord inserted in the apparatus ready to be drawn into position.

The free end of the bar 170 is provided with two spaced fingers 195 which project downwardly therefrom, see Figures 12 and 18. A spring 196 bearing downwardly on the end 175 of the bar tends to keep these fingers above the surface of the table 135. When the drawback bar is required, the link 178 moves it inwardly of the machine. As this link is connected to the downwardly extending end 175 of the bar, this action keeps the fingers 195 above the table 135. When the bar 170 reaches the inner end of its stroke, the fingers 195 have passed over the cord 148 positioned in the machine, as shown in Figure 18. It will be noted that these fingers are spread far enough apart to pass on opposite sides of the blade 118 and tucker 132. When the link 178 starts to move in the opposite direction, it first pivots the bar 170 so that the drawback fingers rest on the table 135. Further movement causes these fingers to pull the cord with them. As the central portion of the cord extends around the tucker 132, the cord is drawn in two portions back on opopsite sides of said tucker, see Figure 19. One end of the cord is firmly held in position by the gripper 156 at this time, but the gripper 140 is free of the cord so that the latter is drawn through the ferrule 149 from its source.

The cord in the machine may now be severed from that extending from the source of supply. The shaft 152 is rotated to allow the fingers 147 to grip the cord, and then a blade 200 is reciprocated in any suitable manner about a point 201 to cut the cord at a point spaced inwardly a little from the gripping fingers, see Figures 18 and 19.

A pair of spaced hold-down fingers 205 is pivotally mounted on each side of the tucker 132, see Figures 13 and 15 to 19. Each pair of fingers is pivotally mounted on a shaft 206 and has a projection 207 which extends substantially downwardly when the fingers lie in a horizontal plane. A spring 208 connected to this projection normally holds the fingers in said plane, as shown in Figure 17. A reset cam 212 having a lug 213 projecting from the surface thereof is mounted on a shaft 214 which is rotated in any desired manner. The lug 213 is adapted to engage the projection 207 during part of each revolution of the cam. When the lug does engage this projection, it swings the hold-down fingers 205 upwardly above and to one side of the cord lying in the machine. When the lug clears the projection, the spring 208 draws the fingers downwardly against the cord firmly to hold it in position. As previously stated, there is a pair of hold-down fingers on each side of the tucker 132, and each pair is in line with a tube 73 and needle 66 of the cord inserting mechanism A.

A hook shoe 220 is positioned in line with each pair of fingers 205 and the needle and tube associated therewith. Each shoe has a funnel-shaped groove 221 in its upper surface, see Figures 18 and 19, and has an extension 223 connected to the bottom thereof and lying substantially in a horizontal plane, the opposite end of said extension being pivotally mounted at 224.

The shoe 220 normally lies a little beneath the surface of table 135, at which time a portion of the extension 223 rests on the surface of cam 212, see Figures 15 and 16. When the cam lug 213 comes around, it raises the extension to move the upper surface of the shoe 220 slightly above the surface of table 135, see Figure 17. A trip lever 228 rotatably mounted on the shaft 214 has a shoulder 229 which fits into a recess 230 formed in the shoe when the latter is raised. A spring 232 normally urges the shoulder towards the shoe. A finger 233 projects upwardly from the lever 228 in line with and spaced from the shoe groove 221.

Figure 19:
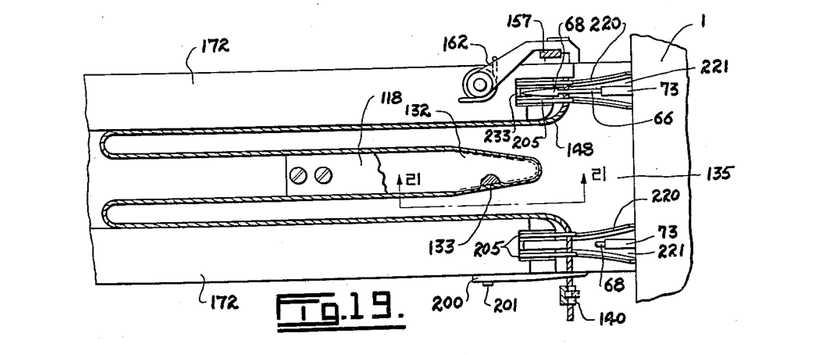
Figure 19 is a plan view similar to Figure 18 with the cord in position and ready to be drawn through a blank.

When the shoe 220 is in its elevated position, the tube 73 with its needle 66 and hook 68 approach the end of their inward stroke. At this time the hook rides through the channel 221 of the shoe which lifts it high enough to clear the portion of the cord 148 lying between the hold-down fingers 205 aligned therewith, see Figures 17 and 19. As previously described, the hook moves away from the end of its tube at the end of the stroke. As soon as the hook has completely passed over the cord, it strikes the finger 233 to pivot the lever 228, thus removing the shoulder 229 from the shoe recess 230. This permits the shoe to drop down on to the surface of the cam 212. When the hook 68 starts on its outward stroke, it draws the cord against the end of its tube so that the cord is moved with the latter and drawn through the blank 1 positioned in the section 90 of the mechanism A. As each end of the cord is gripped between a needle hook and the end of a tube, these ends are drawn through the blank clamped in the apparatus. Figure 19 shows the ends of the cords just before they are clamped against the ends of the tubes. By the time the needle hooks release the cord ends, there is still a portion of the cord outside the blank (the U portion 7 thereof). It is at this time that the tucker 132 is moved forwardly by cylinder 128 to press this excess of cord into the blank where it was previously slit by the blade 118 so that the cord is completely positioned within the blank 1 as shown in Figure 1.

When the carton having the cord therein is in use, there will come a time when it is desirable to remove the excess portion of the cord in order that it may act as a handle. For this purpose, it is desirable to form perforations 9 in the upper layer 3 of the blank at each cord in order that the flaps 9a of said layer may be easily torn away when the excess is to be drawn out of the material to function as a handle. Any perforating mechanism may be used for this purpose.

Figures 11 and 21 show a head 240 having a plurality of perforating needles 241 extending downwardly therefrom and arranged in the desired design. A shaft 242 extends upwardly through a bearing 243 which is slidably mounted on a shaft 244 extending transversely of the machine. The bearing is held in any desired position on the shaft by a set screw 245. A roller 246 is mounted on the upper end of this shaft and is pressed by spring 247 against the surface of a cam 248 mounted on a shaft 249 also extending transversely of the machine. This cam has a projection 250 on its surface which, when it engages the roller 246, depresses the shaft 242 and its head 240 to perforate the layer 3 of the blank 1 lying on the surface of the table 135. This action is preferably timed to take place after the cord has been tucked into a blank.

*General operation*

After a blank 1 is clamped in the section 90 of the machine, the needle and tube assemblies 15 are moved therethrough. At the same time, the slitter blades 118 are moved into the opposite edge of the blank. After these blades are retracted, the grippers 140 draw the cords 148 transversely and inwardly of the machine until they are secured by the grippers 156. During this time, the tuckers 132 are elevated into operative position, and the drawback bars 170 are moved inwardly until the fingers 195 thereof pass over the cord. The return movement of the drawback bars draws the required amount of cord into the machine, see Figure 19, after which the pieces are cut from the cord supplies by blades 200. The hold-down fingers 205 now move downwardly to hold the cord firmly in position in line with the needle shoes 220, each of which is raised above the surface of the table 135. By this time, the needle hooks 68 ride over the shoes beyond the portions of the cords between the hold-down fingers and abut against the fingers 233 to move levers 228 and allow the shoes to drop downwardly beneath the table surface. During the return movement, the hooks grip the cords against their respective tubes and draw said cords through the blank. As the hooks approach the opposite edge of the blank, they release the cords. The staplers 112 may now be operated to secure the ends of the cord in the blank. At the same time, the tuckers are moved towards the blank to press the excess portions of the cords into the latter. After these tuckers have been withdrawn, the perforating heads 240 may be lowered to perforate the upper layer of material forming the blank so that a portion of said material may easily be removed when this is necessary.

What I claim as my invention is:

1. In apparatus for inserting cord through a cardboard blank from edge to edge thereof; a cord inserting mechanism comprising supporting means for holding a cardboard blank in a given plane, a tube slidably supported to one side of the supporting means in said plane, said tube being long enough to extend through a blank, means connected to one end of the tube for moving it forward and back past the supporting means through the blank plane, a needle extending through the tube and projecting from the free end thereof, hook means on the end of the needle protruding from the tube, said needle moving with the tube, means for moving the hook relative to the adjacent end of the tube at opposite ends of each stroke thereof, and cutters on the free end of the tube projecting outwardly therefrom in the blank plane.

2. In apparatus for inserting cord through a cardboard blank from edge to edge thereof; a cord inserting mechanism comprising a tube long enough to extend through a cardboard blank, a needle extending through the tube and projecting from both ends thereof, crossheads connected to the adjacent ends of the tube and the needle, track means slidably supporting the crossheads in line with each other, a bolt slidably extending through the crossheads parallel with the tube and needle, resilient means normally maintaining the crossheads spaced apart on the bolt, means on each end of the bolt for limiting the outward movement of the crossheads thereon, means connected to one of the limiting means for moving the tube and needle forward and back through the blank, a hook on the free end of the needle, and a stop positioned at each end of the track means to be engaged by one of the crossheads at each end of the stroke thereof to cause relative movement between said crossheads.

3. A cord inserting mechanism as claimed in claim 2 including means adjustably mounting each stop on an end of the track mean for movement longitudinally of the latter.

4. In apparatus for inserting cord through a cardboard blank from edge to edge thereof; a cord inserting mechanism comprising a tube long enough to extend through a a cardboard blank, a needle extending through the tube and projecting from both ends thereof, a guide near one end of the tube through which said tube slidably extends, separate supports for the tube and needle at the end of the tube remote from the guide, said guide and said tube and needle supports being slidably mounted for movement at right angles to the path of movement of the needle and tube, hook means on the end of the needle opposite the supported end thereof, means for reciprocating the tube and needle together, and means for moving the hook relative to the adjacent end of the tube at opposite ends of each stroke thereof.

5. In apparatus for inserting cord through a cardboard blank from edge to edge thereof; a cord inserting mechanism comprising a pair of parallel tubes long enough to extend through a cardboard blank, a needle extending through each tube and projecting from both ends thereof, crossheads connected to the adjacent ends of the tubes and the needles, track means slidably supporting the crossheads in line with each other, a bolt slidably extending through the crossheads parallel with the tubes and needles, resilient means normally maintaining the crossheads spaced apart on the bolt, means on each end of the bolt for limiting the outward movement of the crossheads thereon, means connected to one of the limiting means for moving the tubes and needles forward and back through the blank, hook means on the free end of each needle, and a stop positioned at each end of the track means to be engaged by one of the crossheads at each end of the stroke thereof to cause relative movement between said crossheads.

6. In apparatus for inserting cord through a cardboard blank from edge to edge thereof; a cord inserting mechanism comprising a tube long enough to extend through a cardboard blank, a needle extending through the tube and projecting from both ends thereof, a guide near one end of the tube through which the latter slidably extends, separate supports for the tube and needle at the end of the tube remote from the guide, separate shafts extending through the guide and each support substantially at right angles to the tube and needle, means for clamping the guide and supports on their respective shafts, hook means on the end of the needle opposite the supported end thereof, means for reciprocating the tube and needle together with their shafts, and means for moving the needle and its shaft relative to the tube and its shaft at opposite ends of each stroke thereof.

7. In apparatus for inserting cord through a cardboard blank from edge to edge thereof; cord feeding means comprising a stationary gripper having a pair of jaws, means for opening and closing said jaws, a movable gripper normally spaced from the stationary gripper and having a pair of jaws, said latter jaws normally spanning a cord, means for opening and closing the movable gripper jaws, and means for reciprocating the movable gripper up to and away from the stationary gripper, the stationary gripper jaws being open and the movable gripper jaws being closed when the latter moves towards the former, and the setting of the jaws being reversed when the movement is in the opposite direction.

8. In apparatus for inserting cord through a cardboard blank from edge to edge thereof; cord feeding and positioning means comprising means for drawing an end of a cord across the apparatus, gripping means for receiving the cord end, a drawback bar mounted for movement transversely of the cord, a finger projecting downwardly from one end of the bar, means for reciprocating the bar over the cord transversely thereof, and means for raising the bar finger when the bar is moved in one direction over the cord and lowering said finger to catch the cord when the bar is moved in the opposite direction, thereby drawing a given length of cord into the apparatus.

9. In apparatus for inserting cord through a cardboard blank from edge to edge thereof; cord feeding and positioning means comprising means for drawing an end of a cord across the apparatus, gripping means for receiving the cord end, a drawback bar mounted for movement transversely of the cord, said bar being pivotally mounted adjacent one end for movement in a vertical plane, a finger projecting downwardly from the end of the bar remote from the pivot thereof, the opposite end of the bar sloping downwardly and outwardly from the pivot, and means pivotally connected to the sloped end of the bar for reciprocating the latter over the cord, the bar finger being raised when the bar is moved in one direction over the cord and being lowered to catch the cord when it is moved in the opposite direction, thereby drawing a given length of cord into the apparatus.

10. In apparatus for inserting cord through a cardboard blank from edge to edge thereof; supporting means for holding a cardboard blank in a given plane, a tube slidably supported to one side of the supporting means in said plane, said tube being long enough to extend through a blank, means connected to one end of the tube for moving it forward and back past the supporting means through the blank plane, a needle extending through the tube and projecting from the free end thereof, hook means on the end of the needle protruding from the tube, said needle moving with the tube, means for moving the hook relative to the adjacent end of the tube at opposite ends of each stroke thereof, means for holding a cord across the path of the needle on the opposite side of the blank supporting means from the tube and needle, and means between the cord position and the blank supporting means for lifting the end of the needle over a cord in said position after said needle has passed through a blank on the supporting means, said lifting means dropping the needle end after the latter has moved over the cord, said hook means passing over the cord after the tube and needle have moved through the blank and drawing it against the adjacent end of the tube as the needle moves back in the opposite direction.

11. In apparatus for inserting cord through a cardboard blank from edge to edge thereof; supporting means for holding a cardboard blank in a given plane, means for drawing an end of a cord in a path across the apparatus near the supporting means and parallel with the blank plane, gripping means for receiving the end of a cord moved by the drawing means, a tucker near the gripping means on the side of the cord path remote from the blank supporting means, means for drawing portions of the cord away from the blank supporting means on opposite sides of the tucker, means for holding portions of both ends of the cord on opposite sides of the tucker in said cord path, a pair of spaced parallel tubes slidably supported on the opposite side of the blank supporting means from the tucker and in the blank plane, said tubes being in line with said cord path on opposite sides of the tucker, means connected to one end of the tubes for moving them forward and back past the supporting means through the blank plane, a needle extending through each tube and projecting from the free end thereof, hook means on the end of each needle protruding from each tube, said needles moving with the tubes, means for moving the hooks relative to the adjacent ends of the tubes at opposite ends of each stroke thereof, each hook means passing over a cord end after the tubes and needles have moved through the blank on the supporting means and drawing it against the adjacent end of its tube as the needles move back in the opposite direction, and means for moving the tucker toward the supporting means and into the edge of a blank on said supporting means to press the portion of the cord between it and the blank into the latter.

12. In apparatus for inserting cord through a cardboard blank from edge to edge thereof; a cord inserting mechanism comprising a pair of parallel tubes long enough to extend through a cardboard blank, a needle extending through each tube and projecting from both ends thereof, hook means on one end of each needle, a plurality of spaced shafts extending transversely of the tubes and needles, means slidably mounted on one shaft and slidably supporting the ends of the tubes adjacent the hooks, a carrier slidably mounted on another shaft and supporting both tubes at their opposite ends, a carrier slidably mounted on another shaft and supporting both needles at the ends thereof near the tube carrier, means for reciprocating together the shafts supporting the tube and needle carriers, and means for moving the needle carrier shaft relative to the tube carrier shaft at opposite ends of each stroke thereof, said relative movement of the shafts moving the needles in relation to the tubes.

13. In apparatus for inserting cord through a cardboard blank from edge to edge thereof; a cord inserting mechanism comprising a pair of tracks, a pair of aligned crossheads slidably mounted in each track, an outer shaft connected to one crosshead of each pair thereof, an inner shaft connected to the other crosshead of each pair, a carrier slidably mounted on each shaft, a tube connected at one end to the carrier of the inner shaft and extending outwardly therefrom substantially at right angles to said shaft, a needle connected at one end to the carrier of the outer shaft and extending through and beyond the tube, a hook on the end of the needle remote from the carrier thereof; each pair of crossheads having a bolt slidably extending therethrough parallel with the tube and needle, resilient means normally maintaining the crossheads spaced apart on the bolt, means on each end of the bolt for limiting the outward movement of the crossheads thereon; means connected to at least one crosshead bolt to move the crossheads back and forth along the tracks, and a stop positioned at each end of the track means to be engaged by one of the crossheads at each end of the stroke thereof to cause relative movement between said crossheads.

14. A cord inserting mechanism as claimed in claim 13 in which there are two parallel outer shafts connected to the same crossheads and two parallel inner shafts connected to the other crossheads, each of the carriers being mounted on two parallel shafts, a pair of parallel identical tubes projecting outwardly from one carrier, and a plurality of parallel identical needles extending from the other carrier through and beyond said tubes, said additional needle also having a hook on the end thereof remote from its carrier.

15. In apparatus for inserting cord through a cardboard blank from edge to edge thereof; cord feeding means comprising a stationary gripper having a pair of jaws, means for opening and closing said jaws, a movable gripper normally spaced from the stationary gripper; said movable gripper comprising a pair of crossed arms pivotally connected together substantially midway between their opposite ends, the lower ends of said arms forming gripping jaws normally spanning a cord, and spring means normally keeping said jaws closed; means connected to the movable gripper for reciprocating it up to and away from the stationary gripper, a rotatably-mounted shaft extending between the upper ends of the movable gripper arms and parallel with the path of travel of the latter gripper, said shaft being wider on one transverse axis than another and being rotatable to spread the arms apart to open the jaws and to free said arms, the stationary gripper jaws being open and the movable gripper jaws being closed when the latter moves towards the former, and the setting of the jaws being reversed when the movement is in the opposite direction.

16. In apparatus for inserting cord through a cardboard blank from edge to edge thereof; cord feeding and positioning means comprising an elongated tucker, means for drawing an end of a cord across the apparatus and an end of the tucker, gripping means for receiving the cord end, a drawback bar above the tucker mounted for movement longitudinally thereof and transversely of the cord, said bar being pivotally mounted adjacent one end for movement in a vertical plane, a pair of fingers projecting downwardly from the end of the bar remote from the pivot thereof with one finger on each side of the tucker, the opposite end of the bar sloping downwardly and outwardly from the pivot, and means pivotally connected to the sloped end of the bar for reciprocating the latter over the cord, the bar fingers being raised when the bar is moved in one direction over the cord and being lowered to catch the cord when it is moved in the opposite direction, thereby drawing a given length of cord into the apparatus around one end of the tucker and along the sides thereof.

17. In apparatus for inserting cord through a cardboard blank from edge to edge thereof; supporting means for holding a cardboard blank in a given plane, a slitter blade positioned to one side of and extending towards the supporting means and lying parallel with and within said plane, an elongated tucker parallel with and spaced below the blade, means connecting together the ends of the blade and tucker remote from the blank supporting means, means for elevating the tucker to bring it into the blank plane and to move the blade out of said plane, and means for moving the blade and tucker into and out of a blank on the supporting means at an edge of said blank when each is positioned in the blank plane.

18. In apparatus for inserting cord through a cardboard blank from edge to edge thereof; supporting means for holding a cardboard blank in a given plane, a slitter blade positioned to one side of and extending towards the supporting means and lying parallel with and within said plane, an elongated tucker parallel with and spaced below the blade, means connecting together the ends of the blade and tucker remote from the blank supporting means, means for elevating the tucker to bring it into the blank plane and to move the blade out of said plane, means for drawing an end of a cord in a path across the apparatus and an end of the tucker when the latter is in the blank plane, gripping means for receiving the end of a cord moved by the drawing means, a drawback bar above the blade and tucker mounted for movement longitudinally thereof and transversely of the cord path, a pair of fingers projecting downwardly from the end of the bar which extends towards the blank supporting means with one finger on each side of the blade and tucker, means for reciprocating the bar over the cord and raising said bar above the cord as it moves towards the blank supporting means and dropping the bar to catch the cord when it is moved in the opposite direction, means for elevating the tucker to bring it into the blank plane and to move the blade out of said plane, said tucker being in the blank supporting means plane when the drawback bar is moving away from the blank so that the fingers of the bar draw cord around the tucker end and along the sides of the latter, and means for moving the blade and tucker into and out of a blank on the supporting means at an edge of said blank when each is positioned in the blank plane, said blade slitting the blank and the tucker inserting the cord drawn around its end into the slit blank.

19. In apparatus for inserting cord through a cardboard blank from edge to edge thereof; supporting means for holding a cardboard blank in a given plane, a tube slidably supported to one side of the supporting means in said plane, said tube being long enough to extend through a blank, means connected to one end of the tube for moving it forward and back past the supporting means through the blank plane, a needle extending through the tube and projecting from the free end thereof, hook means on the end of the needle protruding from tube, said needle moving with the tube, means for moving the hook relative to the adjacent end of the tube at opposite ends of each stroke thereof, means for holding a cord across the path of the needle on the opposite side of the blank supporting means from the tube and needle, a pivotally-mounted hook shoe between the cord and blank supporting means in line with the tube and needle and normally below the blank plane, said shoe having a groove in its upper surface extending in the direction of the needle, means for elevating the shoe to lift the end of the needle over the cord after it has passed through a blank on the supporting means, a trip lever mounted removably to retain the shoe in its elevated position, and a finger projecting from the lever into the path of the needle on the opposite side of the cord from the shoe, said needle striking the finger after passing over the cord to move the trip lever and free the shoe, whereby said shoe is clear of the needle as the hook means of the latter draws the cord into and through the blank.

References Cited in the file of this patent

UNITED STATES PATENTS

| | | |
|---|---|---|
| 99,928 | McColl | Feb. 15, 1870 |
| 1,019,186 | Roberts | Mar. 5, 1912 |
| 2,274,622 | West | Feb. 24, 1942 |
| 2,436,111 | Lowe | Feb. 17, 1948 |
| 2,504,974 | Golden | Apr. 25, 1950 |
| 2,511,658 | West | June 13, 1950 |